(12) United States Patent
Yoso et al.

(10) Patent No.: US 8,400,603 B2
(45) Date of Patent: Mar. 19, 2013

(54) LIQUID CRYSTAL DISPLAY PANEL AND ELECTRONIC APPARATUS

(75) Inventors: Aya Yoso, Tottori (JP); Toshiharu Matsushima, Tottori (JP)

(73) Assignee: Sony Corporation, Tokyo (JP)

( * ) Notice: Subject to any disclaimer, the term of this patent is extended or adjusted under 35 U.S.C. 154(b) by 239 days.

(21) Appl. No.: 13/021,320

(22) Filed: Feb. 4, 2011

(65) Prior Publication Data

US 2011/0194061 A1     Aug. 11, 2011

(30) Foreign Application Priority Data

Feb. 10, 2010    (JP) ................. P2010-027293

(51) Int. Cl.
*G02F 1/1343*    (2006.01)
(52) U.S. Cl. .................................. 349/139; 349/138
(58) Field of Classification Search .............. 349/41, 349/42, 34, 113, 134, 138, 139, 141, 143, 349/144, 147
See application file for complete search history.

(56) References Cited

U.S. PATENT DOCUMENTS

| | | | |
|---|---|---|---|
| 7,714,957 B2 * | 5/2010 | Momoi et al. | 349/106 |
| 7,940,358 B2 * | 5/2011 | Jin et al. | 349/114 |
| 7,978,294 B2 * | 7/2011 | Lee et al. | 349/141 |
| 2005/0200791 A1 | 9/2005 | Ahn | |
| 2007/0121047 A1 | 5/2007 | Chung et al. | |
| 2008/0143911 A1 * | 6/2008 | Jin et al. | 349/48 |
| 2009/0231530 A1 | 9/2009 | Nishimura | |
| 2009/0310075 A1 * | 12/2009 | Kim | 349/144 |
| 2011/0194061 A1 * | 8/2011 | Yoso et al. | 349/139 |

FOREIGN PATENT DOCUMENTS

| | | |
|---|---|---|
| JP | 05-108023 | 4/1993 |
| JP | 2005-258408 | 9/2005 |
| JP | 2007-156403 | 6/2007 |
| JP | 2009-222747 | 10/2009 |

* cited by examiner

*Primary Examiner* — Brian Healy
(74) *Attorney, Agent, or Firm* — K&L Gates LLP

(57) ABSTRACT

A liquid crystal display panel having a plurality of pixels and a first substrate and a second substrate that are so disposed as to be opposed to each other and sandwich a liquid crystal layer, each of the pixels including a display sub-pixel and a viewing angle control sub-pixel, the liquid crystal display panel, includes: a first electrode configured to operate as a pixel electrode and be formed in the first substrate and in each of the display sub-pixels and the viewing angle control sub-pixels; and a second electrode configured to operate as a common electrode and be formed in the first substrate and over the first electrode with intermediary of an insulating film across the display sub-pixels and the viewing angle control sub-pixels, wherein an auxiliary interconnect electrically connected to the second electrode is formed in the viewing angle control sub-pixel.

7 Claims, 11 Drawing Sheets

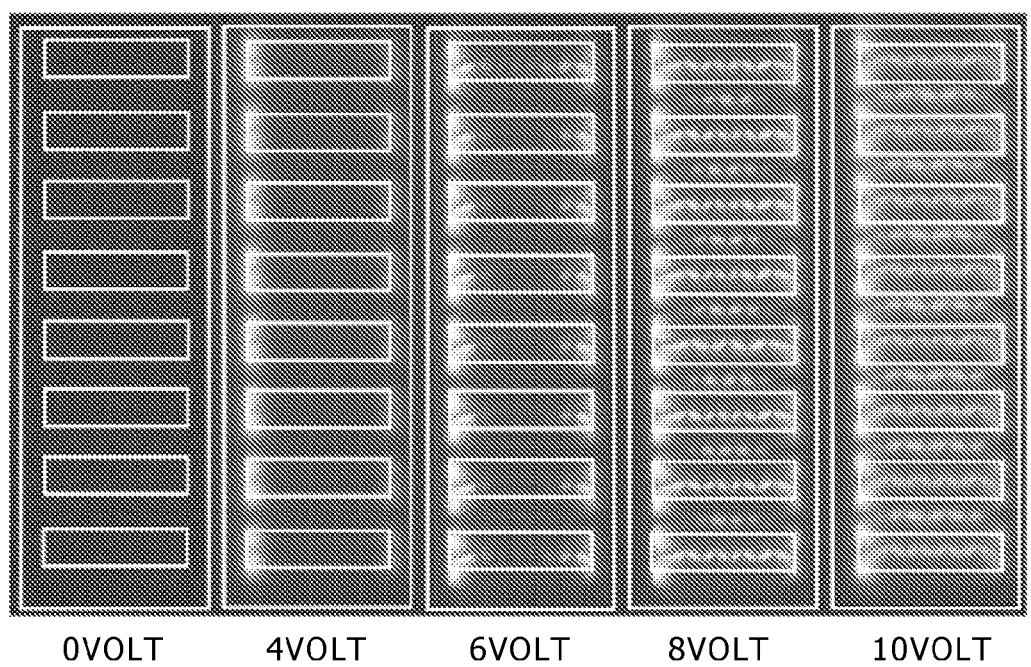
F I G . 5

LIQUID CRYSTAL DISPLAY PANEL AND ELECTRONIC APPARATUS

CROSS REFERENCES TO RELATED APPLICATIONS

The present application claims priority to Japanese Priority Patent Application JP 2010-027293 filed in the Japan Patent Office on Feb. 10, 2010, the entire content of which is hereby incorporated by reference.

BACKGROUND

The present application relates to liquid crystal display panels and electronic apparatus including a viewing angle control sub-pixel, and particularly to a liquid crystal display panel and electronic apparatus in which a viewing angle control sub-pixel operates based on the transverse electric field system.

The liquid crystal display panel has features of lighter weight, smaller thickness, and lower power consumption compared with the cathode ray tube (CRT) and therefore is used as a display unit in many pieces of electronic apparatus. The liquid crystal display panel is to display an image by changing the orientation of liquid crystal molecules aligned along a predetermined direction by an electric field to thereby change the amount of light transmitted through the liquid crystal layer. Among such liquid crystal display panels are a reflective display panel, in which ambient light is incident on the liquid crystal layer and is reflected by a reflective plate to be transmitted through the liquid crystal layer again and be output, a transmissive display panel, in which incident light from a backlight device is transmitted through the liquid crystal layer, and a semi-transmissive display panel having the characteristics of both the reflective display panel and the transmissive display panel.

As the method for applying the electric field to the liquid crystal layer of the liquid crystal display panel, a method of the vertical electric field system and a method of the transverse electric field system are known. In the liquid crystal display panel of the vertical electric field system, an electric field along substantially the vertical direction is applied to liquid crystal molecules by a pair of electrodes sandwiching the liquid crystal layer. As the liquid crystal display panel of this vertical electric field system, display panels of the twisted nematic (TN) mode, the vertical alignment (VA) mode, the multi-domain vertical alignment (MVA) mode, the electrically controlled birefringence (ECB) mode, etc. are known. In the liquid crystal display panel of the transverse electric field system, a pair of electrodes insulated from each other are provided on the internal surface side of one of a pair of substrates sandwiching the liquid crystal layer, and an electric field along substantially the lateral direction is applied to liquid crystal molecules. As the liquid crystal display panel of this transverse electric field system, a display panel of the in-plane switching (IPS) mode, in which the pair of electrodes do not overlap with each other in plan view, and a display panel of the fringe field switching (FFS) mode, in which the pair of electrodes overlap with each other in plan view, are known.

In the IPS-mode liquid crystal display panel, the pair of electrodes as a pixel electrode and a common electrode are formed into a comb-teeth shape so that they may be interdigitated with each other, in such a state as to be electrically insulated from each other, and an electric field along the lateral direction is applied to the liquid crystal between the pixel electrode and the common electrode. Among the IPS-mode liquid crystal display panels are display panels in which both electrodes are formed in the same layer and display panels in which the electrodes are formed in layers different from each other with the intermediary of an insulating film. This IPS-mode liquid crystal display device has an advantage that the viewing angle is wider than that of the liquid crystal display device of the vertical electric field system.

In the FFS-mode liquid crystal display panel, the pair of electrodes as an upper electrode and a lower electrode are disposed in layers different from each other with the intermediary of an insulating film. Furthermore, slit apertures are provided in the upper electrode and an electric field along substantially the lateral direction passing through the slit aperture is applied to the liquid crystal layer. This FFS-mode liquid crystal display panel is increasingly used in recent years because it has an advantage that a wide viewing angle can be obtained and the image contrast can be improved.

As described above, the liquid crystal display panel of the transverse electric field system has a wide viewing angle. However, when confidential information that is not desired to be seen is displayed, it is preferable to employ a small viewing angle to prevent others from having visual contact with the displayed information. So, as shown in Japanese Patent Laid-open No. Hei 5-108023 (hereinafter, Patent Document 1), there has been known a method of adding a liquid crystal panel for viewing angle control to a liquid crystal panel for displaying and controlling the viewing angle characteristics. However, this method has a problem that the addition of the panel for viewing angle control greatly increases the thickness of the liquid crystal display panel. As a solution to this problem, as shown in Japanese Patent Laid-open No. 2007-156403 (hereinafter, Patent Document 2) and Japanese Patent Laid-open No. 2009-222747 (hereinafter, Patent Document 3), there has been known a method of adding a viewing angle control sub-pixel in addition to display sub-pixels of red (R), green (G), and blue (B) and controlling the viewing angle characteristics by controlling the voltage applied to the viewing angle control sub-pixel.

In the liquid crystal display panel including the viewing angle control sub-pixel disclosed in Patent Document 2, the display sub-pixel operates in the IPS mode of the transverse electric field system, and the viewing angle control sub-pixel operates in the ECB mode of the vertical electric field system. When light from the backlight is transmitted in the viewing angle control sub-pixel, the contrast is lowered due to light leakage and thus viewing the displayed image is difficult in the oblique viewing direction. Consequently, the viewing angle control effect can be exerted.

In the liquid crystal display panel including the viewing angle control sub-pixel disclosed in Patent Document 3, both the display sub-pixel and the viewing angle control sub-pixel operate in the FFS mode of the transverse electric field system. The slit aperture of the viewing angle control sub-pixel is extended at a right angle to the rubbing direction. Thus, when an electric field is applied between the pair of electrodes, liquid crystal molecules do not rotate in the direction parallel to the array substrate but are inclined to the perpendicular direction. Therefore, although no influence is given to the image on the display sub-pixels in the direct viewing direction, the contrast is lowered due to light leakage and thus viewing this image is difficult in the oblique viewing direction along which the liquid crystal molecules are inclined. Consequently, the viewing angle control effect can be exerted. The liquid crystal display panel disclosed in Patent Document 3, in which the viewing angle control sub-pixel is based on the transverse electric field system, has an advantage that manufacturing and driving thereof are easy because the viewing angle control sub-pixel and the display sub-pixel can be operated in the same mode and similar driving control can be carried out for both pixels.

SUMMARY

However, in the above-described FFS-mode liquid crystal display panel, the common electrode having the slit aperture is formed across plural pixels and electrical connection of the common electrode to the external is made at the peripheral part of the display area. Thus, the FFS-mode liquid crystal display panel has a problem that the resistance of the common electrode is high and crosstalk is caused as a defect. In particular, when the liquid crystal display panel has a higher resolution, the number of pixels increases and therefore the ratio of the area of the slit aperture becomes higher. Thus, the electric resistance of the common electrode increases. In addition, deviation of the potential of the common electrode due to the capacitive coupling between the common electrode and the pixel electrode, i.e. crosstalk, occurs more readily.

On the other hand, regarding an IPS-mode liquid crystal display panel in which the viewing angle control sub-pixel is not formed, e.g. a technique disclosed in Japanese Patent Laid-open No. 2005-258408 (hereinafter, Patent Document 4) is known. In this technique, both the pixel electrode and the common electrode of the display sub-pixel are endowed with a double structure composed of a transparent electrode and a metal electrode in order to prevent the respective electrodes from having high electric resistance differently from the case in which both the pixel electrode and the common electrode of the display sub-pixel are formed by using a transparent electrically-conductive material. However, in the case of the display sub-pixel in the FFS-mode liquid crystal display panel, because the pixel electrode and the common electrode overlap with each other in plan view, endowing both the pixel electrode and the common electrode with the double structure composed of a transparent electrode and a metal electrode leads to the lowering of the aperture ratio. Therefore, employing this technique is impossible.

There is a need for the present application to decrease the electric resistance of a common electrode to reduce crosstalk in a liquid crystal display panel including a viewing angle control sub-pixel of the transverse electric field system such as the FFS mode and the IPS mode, and provide a liquid crystal display panel having a favorable viewing angle control function.

According to an embodiment of the present application, there is provided a liquid crystal display panel having a plurality of pixels and a first substrate and a second substrate that are so disposed as to be opposed to each other and sandwich a liquid crystal layer. Each of the pixels includes a display sub-pixel and a viewing angle control sub-pixel. The liquid crystal display panel includes a first electrode configured to operate as a pixel electrode and be formed in the first substrate and in each of the display sub-pixels and the viewing angle control sub-pixels, and a second electrode configured to operate as a common electrode and be formed in the first substrate and over the first electrode with the intermediary of an insulating film across the display sub-pixels and the viewing angle control sub-pixels. An auxiliary interconnect electrically connected to the second electrode is formed in the viewing angle control sub-pixel.

In the liquid crystal display panel of the embodiment of the present application, both the display sub-pixel and the viewing angle control sub-pixel operate based on the transverse electric field system, and thus viewing angle control can be carried out by driving control similar to that for the display sub-pixel. Therefore, manufacturing and driving of the liquid crystal display panel are easy. In addition, in the liquid crystal display panel of the embodiment of the present application, the auxiliary interconnect to electrically connect the common electrode to a common interconnect in the non-display area is provided. Thus, the electric resistance of the common electrode is lowered, which can reduce crosstalk.

In the liquid crystal display panel of the embodiment of the present application, it is preferable that a signal line and a scan line be formed in the viewing angle control sub-pixel of the first substrate and the auxiliary interconnect be formed in the same layer as a layer of the signal line or the scan line.

According to the liquid crystal display panel of the embodiment of the present application, the auxiliary interconnect can be formed in the same step as that of the signal line or the scan line, and thus addition of the step of forming the auxiliary interconnect can be prevented. Furthermore, because the auxiliary interconnect is formed in the first substrate as with the first and second electrodes, positional misalignment in bonding of the first substrate to the second substrate does not occur differently from the light blocking layer formed in the second substrate.

When the viewing angle control sub-pixel is adjacent to the display sub-pixel along the extending direction of the scan line, the auxiliary interconnect can communicate with the common electrode of the plural viewing angle control sub-pixels if the auxiliary interconnect is formed in the same layer as that of the signal line. When the viewing angle control sub-pixel is adjacent to the display sub-pixel along the extending direction of the signal line, the auxiliary interconnect can communicate with the common electrode of the plural viewing angle control sub-pixels if the auxiliary interconnect is formed in the same layer as that of the scan line.

In the liquid crystal display panel of the embodiment of the present application, it is preferable that the auxiliary interconnect be located on the end part side of the first electrode of the viewing angle control sub-pixel.

In the liquid crystal display panel of the transverse electric field system, the alignment of liquid crystal molecules is not settled on the end part side of the first electrode operating as the pixel electrode and therefore this end part side is an area from which light is readily leaked. According to the liquid crystal display panel of the embodiment of the present application, light blocking is achieved for this area from which light is readily leaked by the auxiliary interconnect composed of a metal material. Thus, light leakage in the direct viewing direction can be further reduced.

In the liquid crystal display panel of the embodiment of the present application, a plurality of slits may be formed in the second electrode of the viewing angle control sub-pixel, and the auxiliary interconnect may have an extension part extended from the auxiliary interconnect at a position corresponding to the center of the width of the slit.

If the second electrode operating as the common electrode of the viewing angle control sub-pixel has slit apertures, light is leaked in the perpendicular direction from the position corresponding to the center of the width of the slit aperture and the position corresponding to the center of the width of the region between the slit apertures, and the light leakage in the perpendicular direction is stronger at the former position. According to the liquid crystal display panel of the embodiment of the present application, the auxiliary interconnect composed of a metal material is extended to the position corresponding to the center of the width of the slit aperture. This makes it possible to favorably suppress light leakage in the direct viewing direction even when the second electrode operating as the common electrode of the viewing angle control sub-pixel has the slit apertures.

In the liquid crystal display panel of the embodiment of the present application, a plurality of slits may be formed in the second electrode of the viewing angle control sub-pixel, and the auxiliary interconnect may have an extension part extended from the auxiliary interconnect at a position corresponding to the center of a region between the slits adjacent to each other.

If the second electrode operating as the common electrode of the viewing angle control sub-pixel has slit apertures, light is leaked in the perpendicular direction also from the position corresponding to the center of the width of the region between the slit apertures. According to the liquid crystal display panel of the embodiment of the present application, the auxiliary interconnect composed of a metal material is extended to the position corresponding to the center of the width of the region between the slit apertures. This makes it possible to favorably suppress light leakage in the direct viewing direction even when the second electrode operating as the common electrode of the viewing angle control sub-pixel has the slit apertures.

In the liquid crystal display panel of the embodiment of the present application, it is preferable that the auxiliary interconnect be composed of a metal material.

Because the electrical conductivity of the metal material is extremely favorable compared with the transparent electrically-conductive material, the effect to decrease the electric resistance of the common electrode favorably appears. Examples of the metal material that can be used in the liquid crystal display panel of the embodiment of the present application include aluminum, aluminum alloys, molybdenum, tungsten, titanium, and copper. Because the metal material is not transparent, the aperture ratio is lowered if the auxiliary interconnect composed of the metal material is so formed as to overlap with the common electrode of the display sub-pixel. However, in the liquid crystal display panel of the embodiment of the present application, the auxiliary interconnect composed of the metal material is formed in the viewing angle control sub-pixel. Therefore, no influence is given to the aperture ratio of the display sub-pixel.

According to another embodiment of the present application, there is provided electronic apparatus including the above-described liquid crystal display panel.

This embodiment of the present application can provide electronic apparatus including a liquid crystal display panel capable of exerting the above-described advantageous effects.

Additional features and advantages are described herein, and will be apparent from the following Detailed Description and the figures.

BRIEF DESCRIPTION OF THE FIGURES

FIG. 5 is a plan view showing light leakage of a viewing angle control sub-pixel;

DETAILED DESCRIPTION

Figure 1:
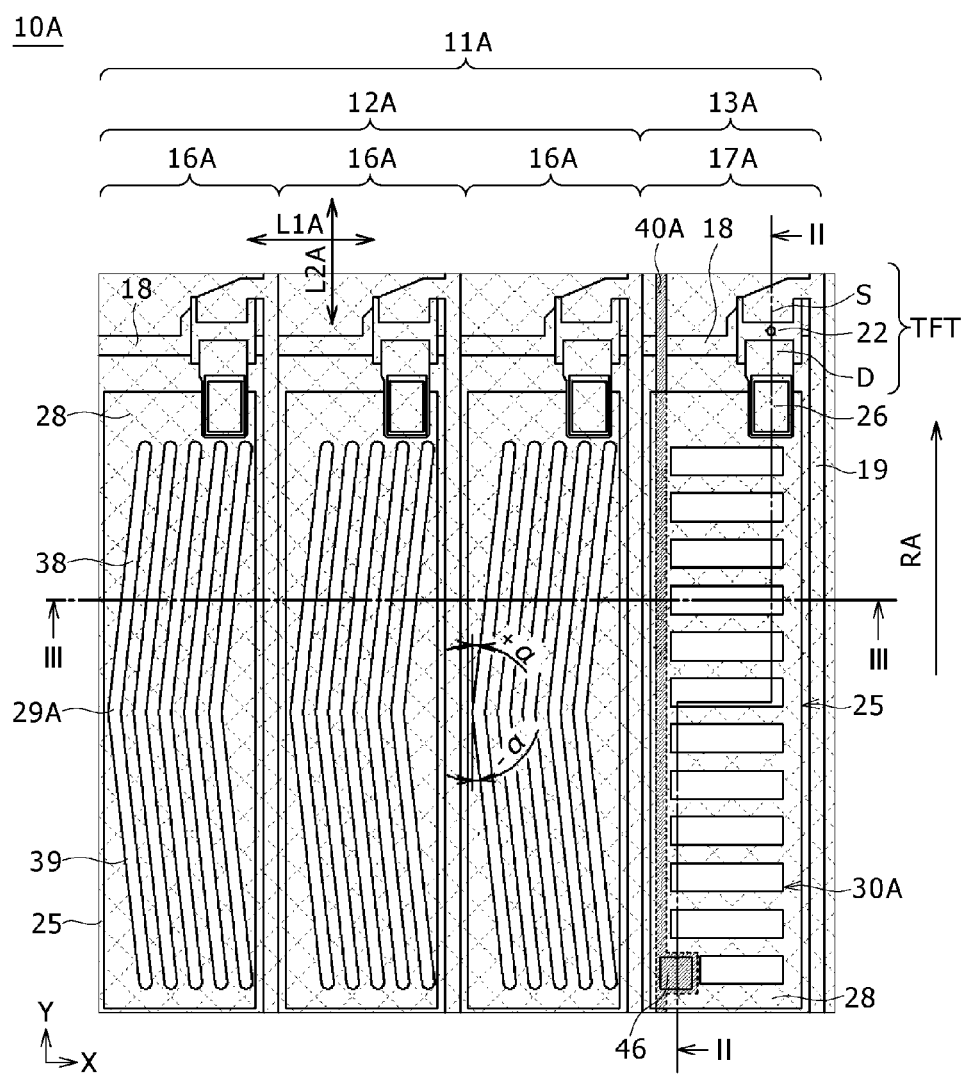
FIG. 1 is a plan view showing the outline of an array substrate of one pixel in a first embodiment.

Modes for carrying out the present application will be described below with reference to embodiments of the present application and the drawings. The embodiments shown below do not intend to limit the present application to the description of the embodiments, but the present application can be evenly applied to techniques obtained by making various changes without departing from the technical idea shown in the scope of claims. Furthermore, in the respective drawings used for the description in the present specification, the respective layers and the respective members are so represented that the scale is changed for each layer and each member so that the respective layers and the respective members may have such sizes as to be recognizable in the drawings, and they are not necessarily represented in proportion to the actual dimensions.

First Embodiment

Figure 2:
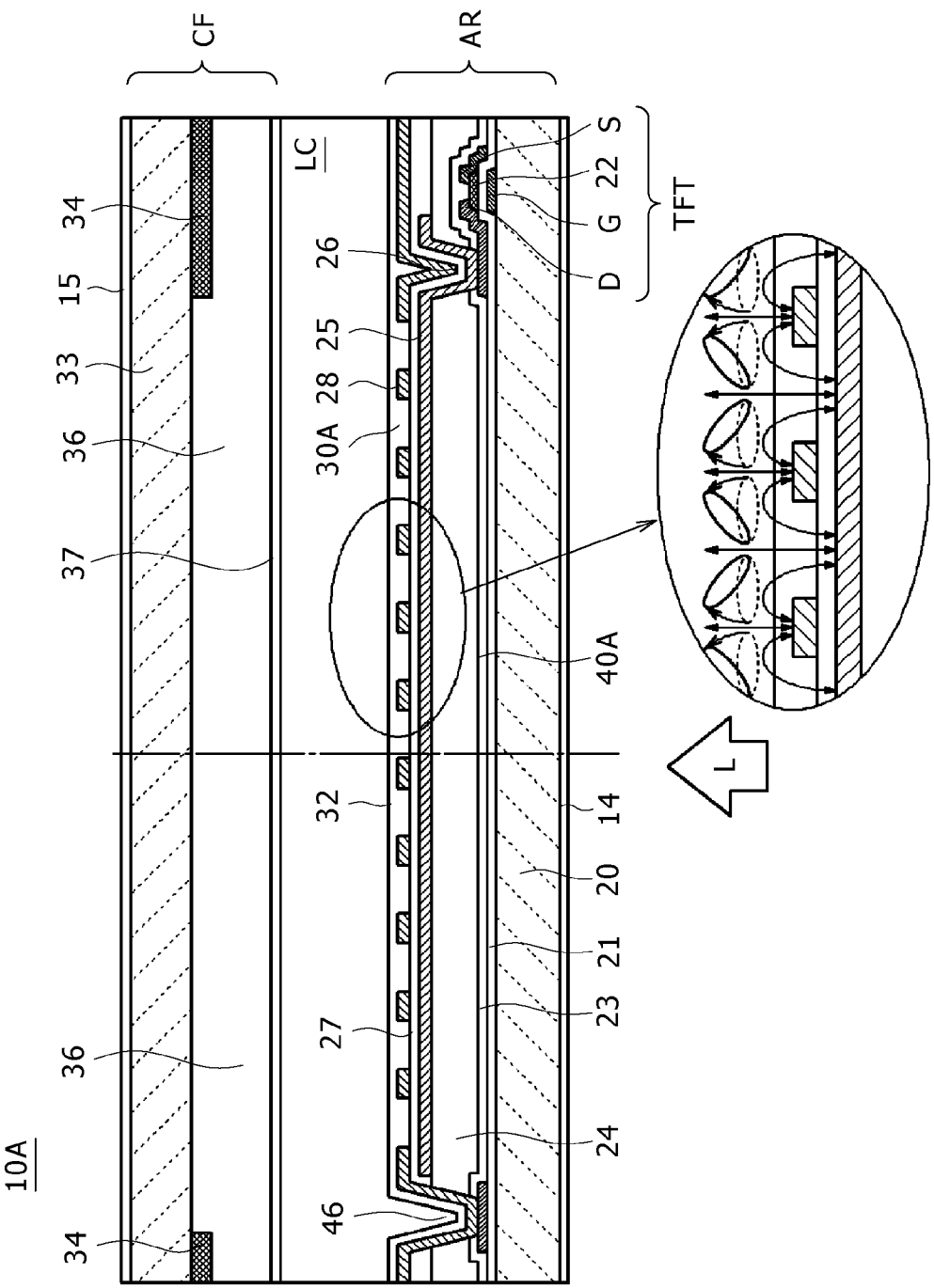
FIG. 2 is a sectional view along line II-II in FIG. 1 for the first embodiment.
Figure 3:
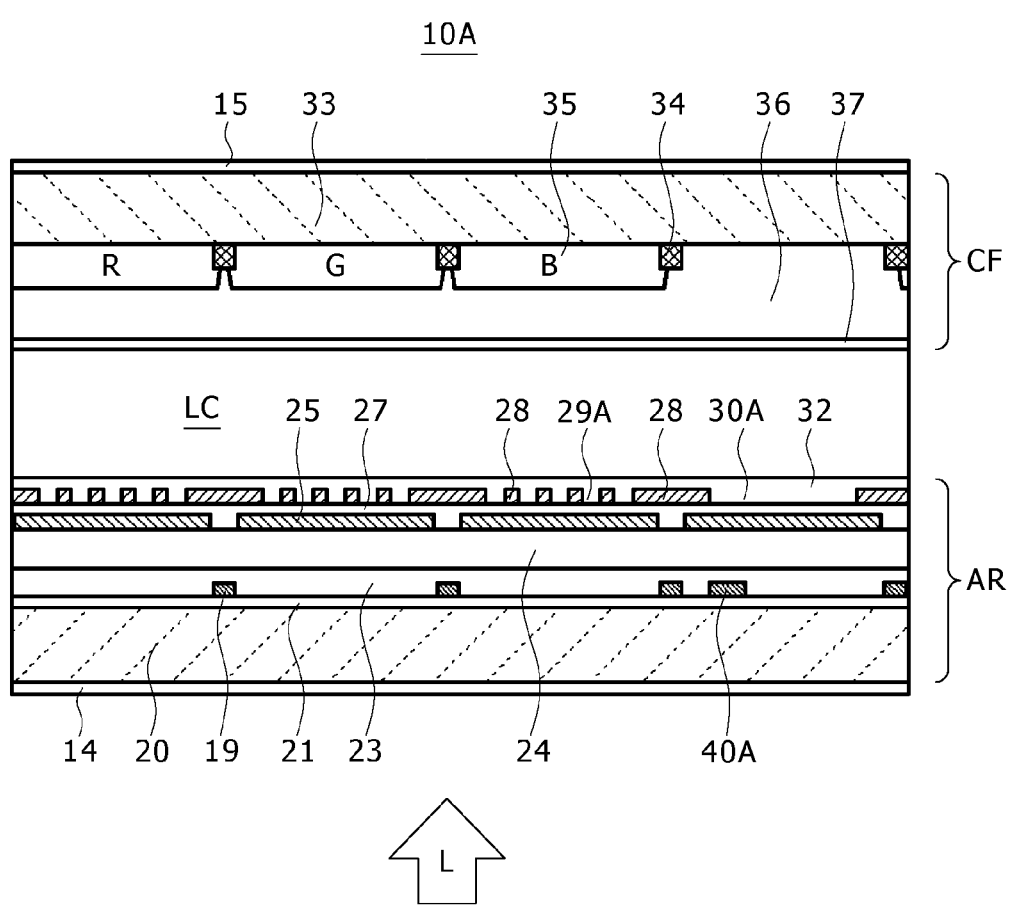
FIG. 3 is a sectional view along line III-III in FIG. 1 for the first embodiment.

The configuration of the major part of a liquid crystal display panel 10A of a first embodiment will be described with use of FIG. 1 to FIG. 4. In FIG. 1, diagrammatic representation of a first alignment film 32 (see FIG. 2) is omitted. In the liquid crystal display panel 10A of the first embodiment, each pixel 11A includes a display part 12A of the FFS mode for color displaying and a viewing angle control part 13A of the FFS mode. As shown in FIG. 2 and FIG. 3, in the liquid crystal display panel 10A, a liquid crystal layer LC is sandwiched by an array substrate AR and a color filter substrate CF. A first polarizer 14 is provided on the outer surface of the array substrate AR on the opposite side to the liquid crystal layer LC, and a second polarizer 15 is provided on the outer surface of the color filter substrate CF on the opposite side to the liquid crystal layer LC. In the liquid crystal display panel 10A of the first embodiment, the first polarizer 14 and the second polarizer 15 are disposed in a crossed Nicols state, and thus the liquid crystal display panel 10A operates in the normally black mode.

The liquid crystal display panel 10A has the plural pixels 11A arranged along the row direction (X-axis direction in FIG. 1) and the column direction (Y-axis direction in FIG. 1). As shown in FIG. 1, one pixel 11A is composed of the display part 12A and the viewing angle control part 13A disposed adjacent to the display part 12A. The display part 12A is composed of display sub-pixels 16A for displaying three colors of red (R), green (G), and blue (B) for example, and the color of the pixel is defined by color mixing of light of these colors. The viewing angle control part 13A includes one viewing angle control sub-pixel 17A.

Each of the display sub-pixels 16A and the viewing angle control sub-pixel 17A of the array substrate AR is provided with a scan line 18 that is extended along the row direction and composed of an opaque metal such as aluminum or molybdenum, a signal line 19 that is extended along the column direction and composed of an opaque metal such as aluminum or molybdenum, and a thin film transistor TFT disposed near the intersection of the scan line 18 and the signal line 19. The thin film transistor TFT of the display sub-pixel 16A and the thin film transistor TFT of the viewing angle control sub-pixel 17A have the same configuration.

The base of the array substrate AR is a first transparent substrate 20 composed of e.g. glass, quartz, or plastic that is transparent and has the insulating characteristic. The scan line 18 is formed on the first transparent substrate 20 on the side opposed to the liquid crystal layer LC, and a gate electrode G is extended from the scan line 18. A transparent gate insulating film 21 composed of e.g. a silicon nitride or a silicon oxide is so stacked as to cover the scan line 18 and the gate electrode G. On the gate insulating film 21 overlapping with the gate electrode G in plan view, a semiconductor layer 22 composed of e.g. amorphous silicon or polycrystalline silicon is formed.

The plural signal lines 19 composed of a metal such as aluminum or molybdenum are formed on the gate insulating film 21 along the column direction. Each of the areas segmented by these scan lines 18 and signal lines 19 serves as the sub-pixel area. A source electrode S is extended from this signal line 19, and this source electrode S is partially in contact with the surface of the semiconductor layer 22.

A drain electrode D formed by using the same material as that of the signal line 19 simultaneously with the signal line 19 is provided on the gate insulating film 21. This drain electrode D is disposed near the source electrode S and partially in contact with the surface of the semiconductor layer 22. The display part 12A having a substantially square shape in one pixel 11A is configured by three display sub-pixels 16A of R, G, and B for example. Therefore, each display sub-pixel 16A trisecting this display part 12A is a rectangle that has the shorter side along the scan line 18 and has the longer side along the signal line 19. The thin film transistor TFT serving as a switching element is configured by the gate electrode G, the gate insulating film 21, the semiconductor layer 22, the source electrode S, and the drain electrode D.

A transparent passivation film 23 composed of e.g. a silicon nitride or a silicon oxide is so stacked as to cover the signal line 19, the thin film transistor TFT, and the exposed part of the gate insulating film 21. An interlayer resin film 24 composed of a transparent resin material such as a photoresist is so stacked as to cover the passivation film 23. The interlayer resin film 24 planarizes the concave-convex surface of the passivation film 23 due to the signal line 19, the thin film transistor TFT, and the gate insulating film 21.

A lower electrode 25 composed of a transparent electrically-conductive material such as indium tin oxide (ITO) or indium zinc oxide (IZO) is so formed as to cover the interlayer resin film 24. A first contact hole 26 that penetrates the interlayer resin film 24 and the passivation film 23 to reach the drain electrode D is formed, and the lower electrode 25 and the drain electrode D are electrically connected to each other via this first contact hole 26. Thus, the lower electrode 25 operates as the pixel electrode.

A transparent inter-electrode insulating film 27 composed of e.g. a silicon nitride or a silicon oxide is so stacked as to cover the lower electrode 25. An upper electrode 28 composed of a transparent electrically-conductive material such as ITO or IZO is so formed as to cover the inter-electrode insulating film 27. The upper electrode 28 is formed across the respective pixels 11A and electrically connected to a common interconnect (not shown). Thus, the upper electrode 28 operates as the common electrode.

As shown in FIG. 1, plural first slit apertures 29A are formed in the upper electrode 28 of the display sub-pixel 16A, and plural second slit apertures 30A are formed in the upper electrode 28 of the viewing angle control sub-pixel 17A. These slit apertures 29A and 30A are formed by performing exposure and development of a photoresist material applied on the surface of the upper electrode 28 by a photolithography method and then performing etching. The first alignment film 32 composed of e.g. polyimide is so stacked as to cover the upper electrode 28 and the inner surfaces of the slit apertures 29A and 30A. Rubbing treatment is performed for the first alignment film 32. When an electric field is not applied to the liquid crystal layer LC, liquid crystal molecules are aligned along the direction of the rubbing treatment.

The base of the color filter substrate CF is a second transparent substrate 33 composed of glass, quartz, plastic, or the like that is transparent and has the insulating characteristic. On the surface of the second transparent substrate 33 closer to the liquid crystal layer LC, e.g. a light blocking layer 34 having light blocking capability is formed at the position opposed to the scan line 18, the signal line 19, and the thin film transistor TFT, which are opaque members of the array substrate AR. Color filter layers 35 through which light of colors different from each other (e.g. three colors of R, G, and B) is transmitted are formed for three display sub-pixels 16A. As shown in FIG. 3, the color filter layer 35 is not formed for the viewing angle control sub-pixel 17A.

An overcoat layer 36 composed of a transparent resin material such as a photoresist is so stacked as to cover the light blocking layer 34 and the color filter layers 35. The overcoat layer 36 of the color filter substrate CF is formed in order to planarize steps due to the color filter layers 35 of the different colors and block impurities from the light blocking layer 34 and the color filter layers 35 so that the impurities may be prevented from entering the liquid crystal layer LC. A second alignment film 37 composed of e.g. polyimide is so formed as to cover the overcoat layer 36. For this second alignment film 37, rubbing treatment along the direction parallel or perpendicular to the optical axis of the polarizer is performed.

Detailed descriptions will be made below about the first slit aperture 29A in the upper electrode 28 of the display sub-pixel 16A, the second slit aperture 30A in the upper electrode 28 of the viewing angle control sub-pixel 17A, and a rubbing treatment direction RA. As shown in FIG. 1, the first slit aperture 29A is formed into a bent shape extended along the extending direction of the signal line 19. Because the display sub-pixel 16A is vertically long, the number of both ends of the first slit apertures 29A becomes large if the first slit apertures 29A are extended along the lateral direction. The end part of the first slit aperture 29A is the area of unusual alignment of liquid crystal molecules. So, in the liquid crystal display panel 10A of the first embodiment, the extending direction of the first slit aperture 29A is set to the vertical direction to thereby decrease the number of end parts of the first slit apertures 29A and reduce the lowering of the aperture ratio.

The first slit aperture 29A having a bent shape is composed of a first sub-slit aperture 38 inclined to the extending direction of the signal line 19 by +a (the clockwise direction is defined as the positive direction and α is defined as a positive value) and a second sub-slit aperture 39 inclined by −α. Although a differs depending on various conditions, it is preferable that a be 3° to 15°. If all the first slit apertures 29A are inclined to the rubbing treatment direction RA in the clockwise direction or the counterclockwise direction, liquid crystal molecules rotate in one direction and thus a phenomenon in which the color changes depending on the viewing direction appears. This is because apparent retardation changes depending on the direction along which the liquid crystal molecules are seen. In this configuration, 5°, which is close to the optimum value, is employed as α. The second slit aperture 30A is so formed as to be extended in parallel to the extending direction of the scan line 18 as shown in FIG. 1.

Figure 4:
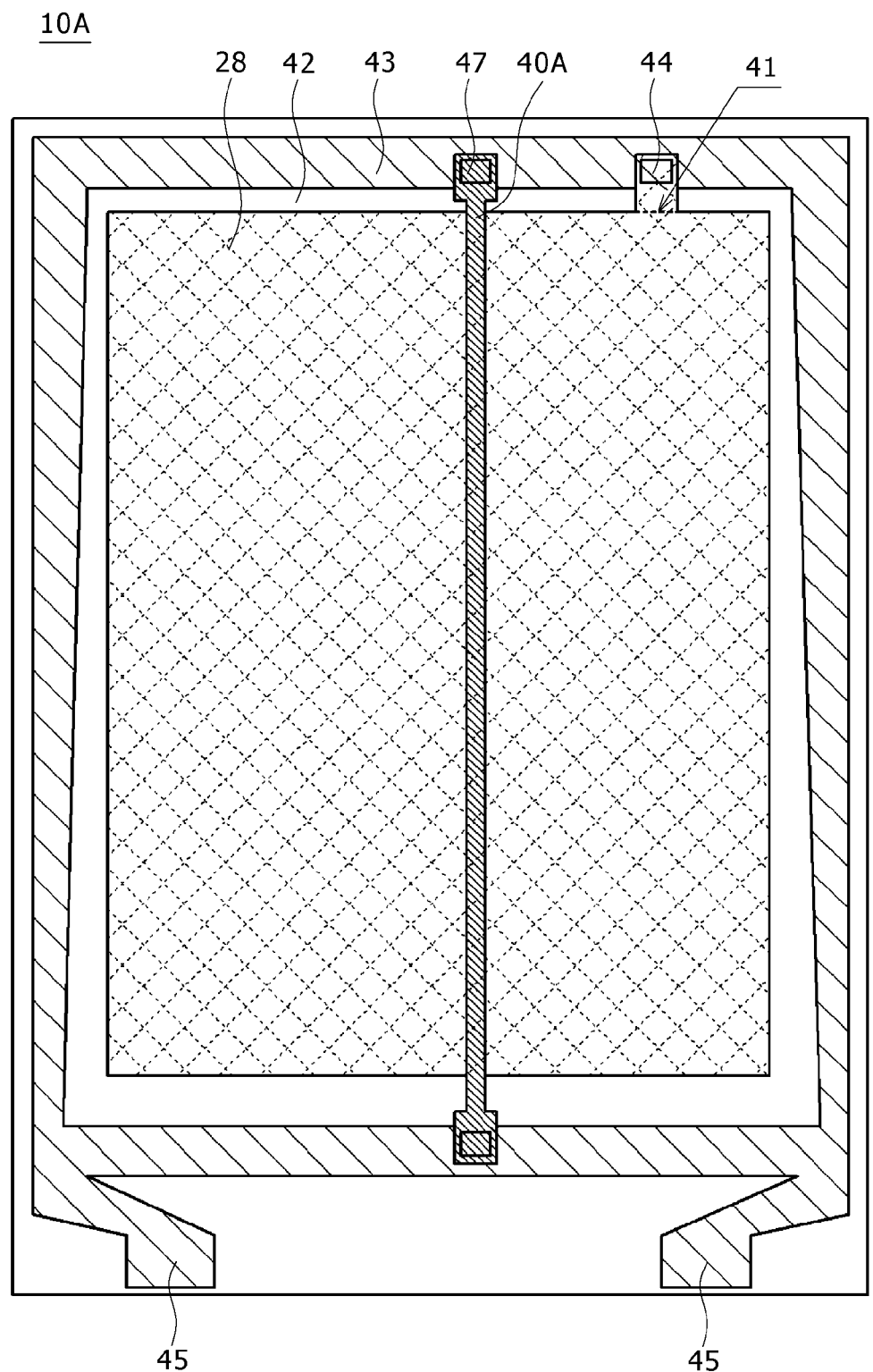
FIG. 4 is a plan view of the array substrate of a liquid crystal display panel, showing connection between an auxiliary interconnect and a common interconnect in the first embodiment.

Next, a description will be made below about an auxiliary interconnect 40A as a measure to decrease the electric resistance of the upper electrode 28 operating as the common electrode of the viewing angle control sub-pixel 17A. The upper electrode 28 of the display sub-pixel 16A and the viewing angle control sub-pixel 17A is formed across all pixels 11A in the liquid crystal display panel 10A. Furthermore, the upper electrode 28 is extended to a common interconnect 43 shown in FIG. 4 through a region above a routing interconnect 42 formed in the non-display area (area other than a display area 41) along the periphery of the display area 41, and is electrically connected to the common interconnect 43 by a second contact hole 44. It is also possible to employ a configuration in which the upper electrode 28 and the common interconnect 43 are electrically connected directly to each other without the intermediary of the second contact hole 44. Although only one second contact hole 44 is shown in FIG. 4 for simplification, plural second contact holes 44 may be formed of course.

The common interconnect 43 has a connection terminal 45 to which power for allowing the upper electrode 28 to operate as the common electrode is supplied. As the shape of the common interconnect 43, the common interconnects 43 are so formed along four sides as to be connected to each other in FIG. 4. However, this shape is a merely example, and the common interconnects 43 may be formed along three sides or two sides for example. Alternatively, they may be independently formed along the respective sides. The display area 41 refers to the area that includes the plural pixels 11A and contributes to displaying. The non-display area refers to the area that is called also as the frame area and does not contribute to displaying. In this non-display area, in addition to the above-described common interconnect 43, the routing interconnect connected to the scan lines 18 and the signal lines 19 and a drive circuit for allowing this routing interconnect to drive the scan lines 18 and the signal lines 19 are formed.

As described above, the area of the upper electrode 28 is small because the first slit apertures 29A are formed therein. In addition, because the upper electrode 28 is not connected to the common interconnect 43 in the display area 41, the resistance of the common electrode is high. In particular, when the liquid crystal display panel has a higher resolution, the number of pixels increases and therefore the ratio of the area of the slit aperture becomes higher. Thus, the electric resistance of the common electrode increases. In addition, deviation of the potential of the common electrode due to the capacitive coupling between the common electrode and the pixel electrode, i.e. crosstalk, occurs more readily.

To address this problem, in the liquid crystal display panel 10A of the first embodiment, the auxiliary interconnect 40A is formed in the same layer by using the same member in the same step as those of the signal line 19. As shown in FIG. 1, the auxiliary interconnect 40A is formed in parallel to the signal line 19. Furthermore, in the pixel 11A adjacent along the Y-direction, the viewing angle control sub-pixel 17A exists at the same position in a continuous manner. The auxiliary interconnect 40A is so formed as to be continuous across the viewing angle control sub-pixels 17A in the respective pixels 11A along the Y-direction.

As shown in FIG. 2, in the upper electrode 28, a third contact hole 46 that penetrates the inter-electrode insulating film 27, the lower electrode 25, the interlayer resin film 24, and the passivation film 23 to reach the auxiliary interconnect 40A is formed. The upper electrode 28 and the auxiliary interconnect 40A are electrically connected to each other via this third contact hole 46. The position of the third contact hole 46 may be any as long as it is in the area of the viewing angle control sub-pixel 17A. However, because the third contact hole 46 itself has light blocking capability, it is preferable to form the third contact hole 46 as close to the auxiliary interconnect 40A as possible. Furthermore, it is preferable that, in the area of the viewing angle control sub-pixel 17A, the third contact hole 46 be formed at the position symmetrical to the thin film transistor TFT formed in this viewing angle control sub-pixel as shown in FIG. 1 in terms of the functioning of the viewing angle control sub-pixel 17A.

As shown in FIG. 1, the viewing angle control sub-pixel 17A is adjacent to the display sub-pixel 16A along the direction of the scan line 18. Therefore, by forming the auxiliary interconnect 40A in the same layer as that of the signal line 19, the auxiliary interconnect 40A can communicate with the common electrode of the plural viewing angle control sub-pixels. As shown in FIG. 4, the auxiliary interconnect 40A communicating with the common electrode of the plural viewing angle control sub-pixels is electrically connected to the common interconnect 43 in the non-display area via a fourth contact hole 47. Although the auxiliary interconnect 40A and the common interconnect 43 are electrically connected to each other via the fourth contact hole 47, they may be connected directly to each other.

As just described, because the auxiliary interconnect 40A is formed in the same layer by using the same member in the same step as those of the signal line 19, the auxiliary interconnect 40A can be formed without addition of a step. Furthermore, the material of the auxiliary interconnect 40A is e.g. an opaque metal such as aluminum, an aluminum alloy, molybdenum, tungsten, titanium, or copper. Because the electrical conductivity of such metals is extremely higher than that of transparent electrically-conductive materials, the auxiliary interconnect 40A has high effect to decrease the electric resistance of the common electrode.

Because the metal material is not transparent, the aperture ratio is lowered if the auxiliary interconnect formed of the metal material is so formed as to overlap with the common electrode of the display sub-pixel 16A. However, in the liquid crystal display panel 10A of the first embodiment, the auxiliary interconnect 40A is formed in the viewing angle control sub-pixel 17A and thus the aperture ratio of the display sub-pixel is not lowered. Furthermore, the auxiliary interconnect 40A is located on the end part side of the lower electrode 25 in the viewing angle control sub-pixel 17A and thus the lowering of the function as the viewing angle control sub-pixel 17A can be suppressed.

The array substrate AR and the color filter substrate CF formed in the above-described manner are made to be opposed to each other, and a seal material (not shown) is provided at the peripheral parts of both substrates to thereby bond both substrates to each other. Subsequently, a liquid crystal is packed between both substrates, and thereby the liquid crystal display panel 10A of the first embodiment is achieved. This liquid crystal display panel 10A operates in the normally black mode. As shown in FIG. 1, the optical axis (transmission axis) L1A of the first polarizer 14 of the array substrate AR is parallel to the scan line 18, and the optical axis L2A of the second polarizer 15 of the color filter substrate CF is parallel to the signal line 19. Incident light L is emitted from a backlight unit (not shown) disposed on the back side of the liquid crystal display panel 10A (see FIG. 2 and FIG. 3).

In the display part 12A, when the thin film transistor TFT is in the OFF-state, the incident light converted to linearly polarized light parallel to the scan line 18 by the first polarizer 14 is incident on the second polarizer 15 as it is. Thus, the incident light can not be transmitted through the liquid crystal display panel 10A, so that black is displayed. If the thin film transistor TFT enters the ON-state, an electric field is generated between the lower electrode 25 and the upper electrode 28 and the alignment of liquid crystal molecules in the liquid crystal layer LC changes, which gives a predetermined phase difference (½ wavelength) to the light passing through the liquid crystal layer LC. Thereby, the incident light converted to the linearly polarized light parallel to the scan line 18 by the first polarizer 14 is incident on the second polarizer 15 after the phase thereof is changed by 90°. Thus, the incident light can pass through the liquid crystal display panel 10A and a chromatic color can be displayed by the color filter layer 35.

When the thin film transistor TFT is in the OFF-state, liquid crystal molecules located in the second slit aperture 30A of the viewing angle control sub-pixel 17A are parallel to the surface of the array substrate AR. Therefore, light is leaked neither in the direct viewing direction of the liquid crystal display panel 10A nor in the oblique viewing direction thereof. Thus, no influence is given to displaying in the display part 12A. If the thin film transistor TFT enters the ON-state, an electric field is generated between the lower electrode 25 and the upper electrode 28. Thus, as shown in the enlarged diagram in FIG. 2, liquid crystal molecules located in the second slit aperture 30A of the viewing angle control sub-pixel 17A are inclined to the surface of the array substrate AR. Therefore, the incident light from the backlight light source is leaked out along the inclination direction. Consequently, although no influence is given to the displaying in the direct viewing direction of the liquid crystal display panel 10A, the contrast is lowered and viewing the image is difficult in the oblique viewing direction of the liquid crystal display panel 10A.

Second Embodiment

Figure 6:
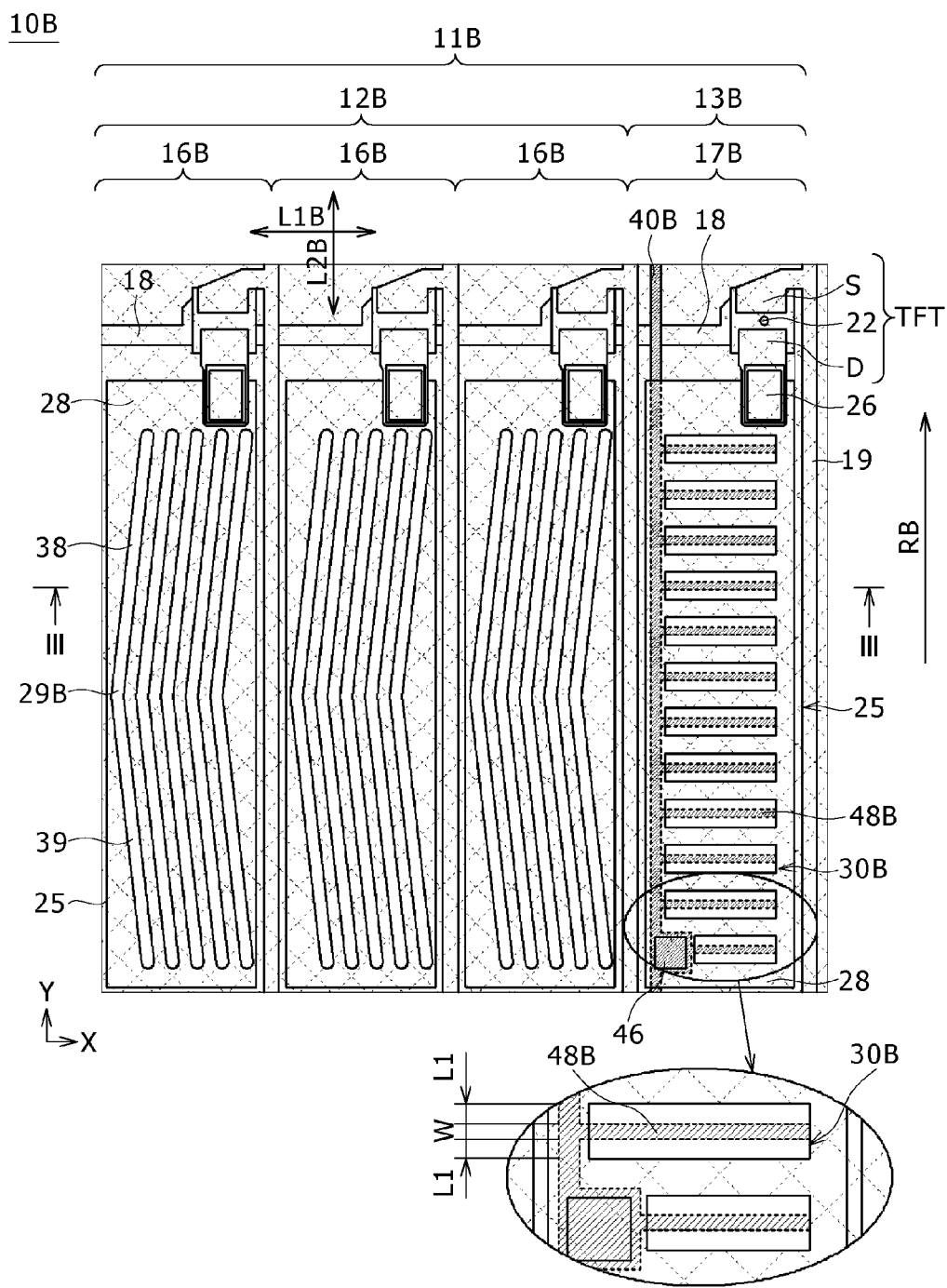
FIG. 6 is a plan view showing the outline of an array substrate of one pixel in a second embodiment.

A liquid crystal display panel 10B of a second embodiment will be described below with use of FIG. 6. FIG. 6 corresponds to FIG. 1 for the liquid crystal display panel 10A of the first embodiment. For the liquid crystal display panel 10B of the second embodiment, the part having the same configuration as that of the part in the liquid crystal display panel 10A of the first embodiment is given the same reference symbol, and the alphabet is changed to "B" for the reference symbol having the alphabet. Detailed description of these parts is omitted. The liquid crystal display panel 10B of the second embodiment is obtained by extending lines from the auxiliary interconnect 40A in the liquid crystal display panel 10A of the first embodiment and allowing these extension parts to function as first light blocking members 48B.

As shown in the enlarged diagram in FIG. 2, the direction of the electric field when the electric field is in the ON-state is substantially perpendicular to liquid crystal molecules when the electric field is in the OFF-state at the center part of the width of the second slit aperture 30A in the upper electrode 28 of the viewing angle control sub-pixel 17A and at the center part of the width of the region between the second slit apertures 30A. Thus, the rotational direction is not settled in liquid crystal molecules at the center part of the width of the second slit aperture 30A and liquid crystal molecules at the center part of the width of the region between the second slit apertures 30A, so that a phenomenon like that shown in FIG. 5 is observed in the direct viewing direction. Furthermore, as shown in FIG. 5, light leakage having the maximum width of about 2 μm occurs in the direct viewing direction if the applied voltage is raised. If the applied voltage is gradually raised, this light leakage occurs earlier and in a longer range at the center part of the width of the second slit aperture 30A than at the center part of the width of the region between the second slit apertures 30A.

So, in the second embodiment, as shown in FIG. 6, the first light blocking member 48B that is formed of the extension part extended from an auxiliary interconnect 40B and has a predetermined width W is provided at the position of the center part of the width of a second slit aperture 30B across the entire length of the second slit aperture 30B in plan view. In the case of FIG. 5, because the width of the light leakage is at most about 2 μm, it is preferable that the width W of the first light blocking member 30B for blocking the leaked light be set to equal to or not less than 2 μm. This makes it possible to favorably reduce the light leakage at the center part of the width of the second slit aperture 30B by the first light blocking member 48B.

The reason why the width W of the first light blocking member 48B is set to 2 μm, which is the width of the light leakage, is because the width of the second slit aperture 30B is set to 5 to 6 μm. Therefore, it is sufficient that the width W of the first light blocking member 48B is about half the width of the second slit aperture 30B.

Furthermore, because the first light blocking member 48B is formed in the same layer as that of the signal line 19, the first light blocking member 48B is formed in the array substrate AR. Therefore, differently from the case in which the light blocking member is formed in the color filter substrate CF, the positions of the first light blocking member 48B and the second slit aperture 30B are not misaligned from each other even when positional misalignment in bonding of the array substrate AR to the color filter substrate CF occurs.

Third Embodiment

Figure 7:
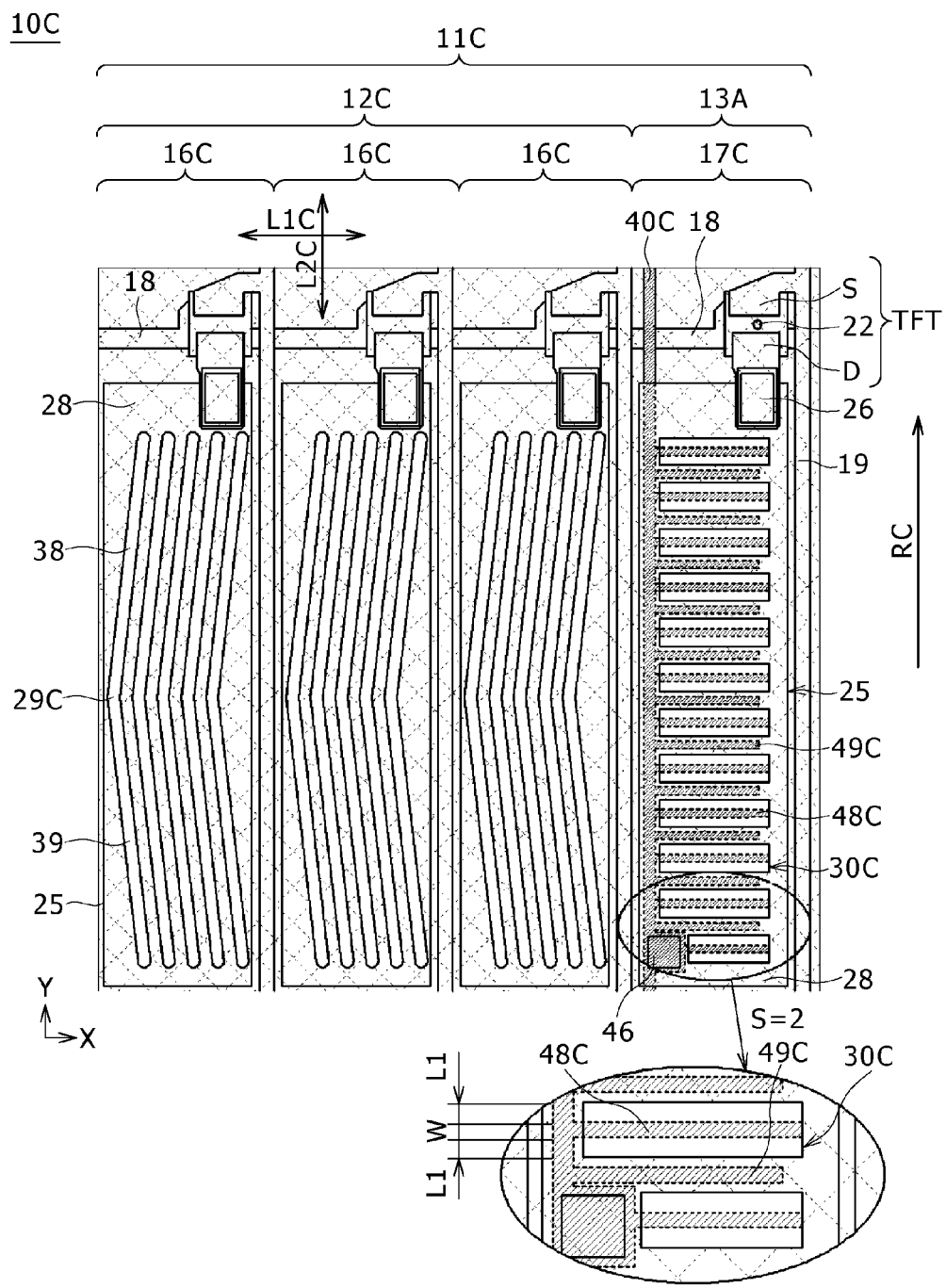
FIG. 7 is a plan view showing the outline of an array substrate of one pixel in a third embodiment.

A liquid crystal display panel 10C of a third embodiment will be described below with use of FIG. 7. FIG. 7 corresponds to FIG. 6 for the liquid crystal display panel 10B of the second embodiment. For the liquid crystal display panel 10C of the third embodiment, the part having the same configuration as that of the part in the liquid crystal display panel 10B of the second embodiment is given the same reference symbol, and the alphabet is changed to "C" for the reference symbol having the alphabet. Detailed description of these parts is omitted. The liquid crystal display panel 10C of the third embodiment is obtained by extending lines from the auxiliary interconnect 40B in the liquid crystal display panel 10B of the second embodiment to further provide the extension parts serving as second light blocking members 49C.

In the liquid crystal display panel 10C of the third embodiment, as shown in FIG. 7, in addition to first light blocking members 48C, the second light blocking members 49C extended from an auxiliary interconnect 40C are also formed at the positions of the center part of the width of the region between second slit apertures 30C in plan view. As just described, in the liquid crystal display panel 10C of the third embodiment, light leakage from the region between the second slit apertures 30C is also blocked and thus light leakage in the direct viewing direction can be further reduced. The length of the light leakage from the region between the second slit apertures 30C is shorter than that of the light leakage from the center part of the width of the second slit aperture 30C.

Thus, the length of the second light blocking member 49C is shorter than that of the first light blocking member 48C. This can reduce the lowering of the aperture ratio due to the light blocking member.

Fourth Embodiment

Figure 8:
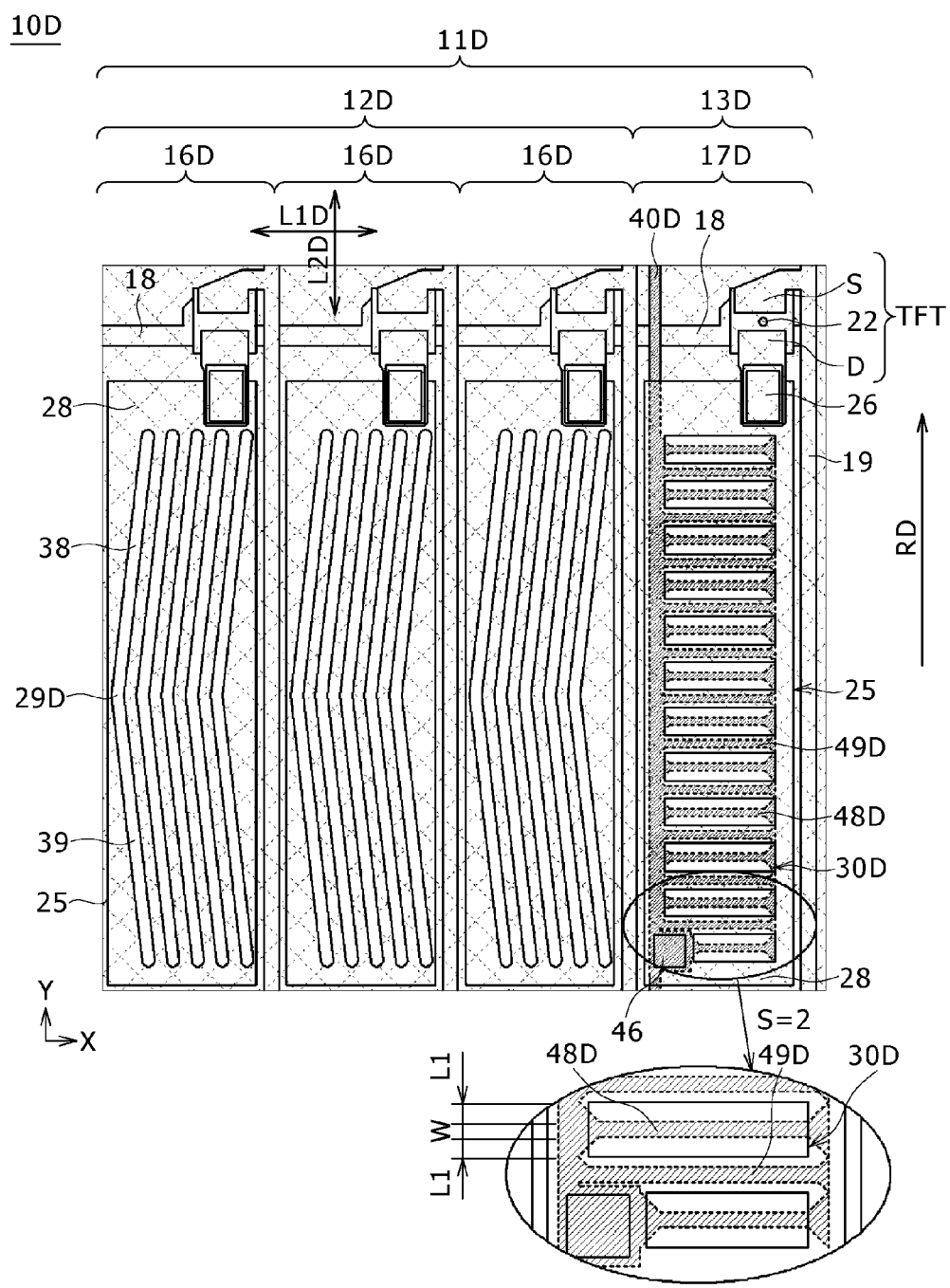
FIG. 8 is a plan view showing the outline of an array substrate of one pixel in a fourth embodiment.

A liquid crystal display panel 10D of a fourth embodiment will be described below with use of FIG. 8. FIG. 8 corresponds to FIG. 7 for the liquid crystal display panel 10C of the third embodiment. For the liquid crystal display panel 10D of the fourth embodiment, the part having the same configuration as that of the part in the liquid crystal display panel 10C of the third embodiment is given the same reference symbol, and the alphabet is changed to "D" for the reference symbol having the alphabet. Detailed description of these parts is omitted. The width of the light blocking member is the main difference in the configuration between the liquid crystal display panel 10D of the fourth embodiment and the liquid crystal display panel 10C of the third embodiment.

In the liquid crystal display panel 10D of the fourth embodiment, as shown in FIG. 8, the width of both ends of first light blocking members 48D and second light blocking members 49D is set larger than that of the parts located at the center part of a second slit aperture 30D and the parts located at the center part of the region between the second slit apertures 30D at the position of the entire edge line of the end parts of the second slit apertures 30D in plan view. As just described, in the liquid crystal display panel 10D of the fourth embodiment, light is blocked also at both ends of the second slit apertures 30D and the regions between the second slit apertures 30D, where the direction of the electric field is different from the direction RD of rubbing treatment. Thus, light leakage in the direct viewing direction can be further reduced.

Fifth Embodiment

Figure 9:
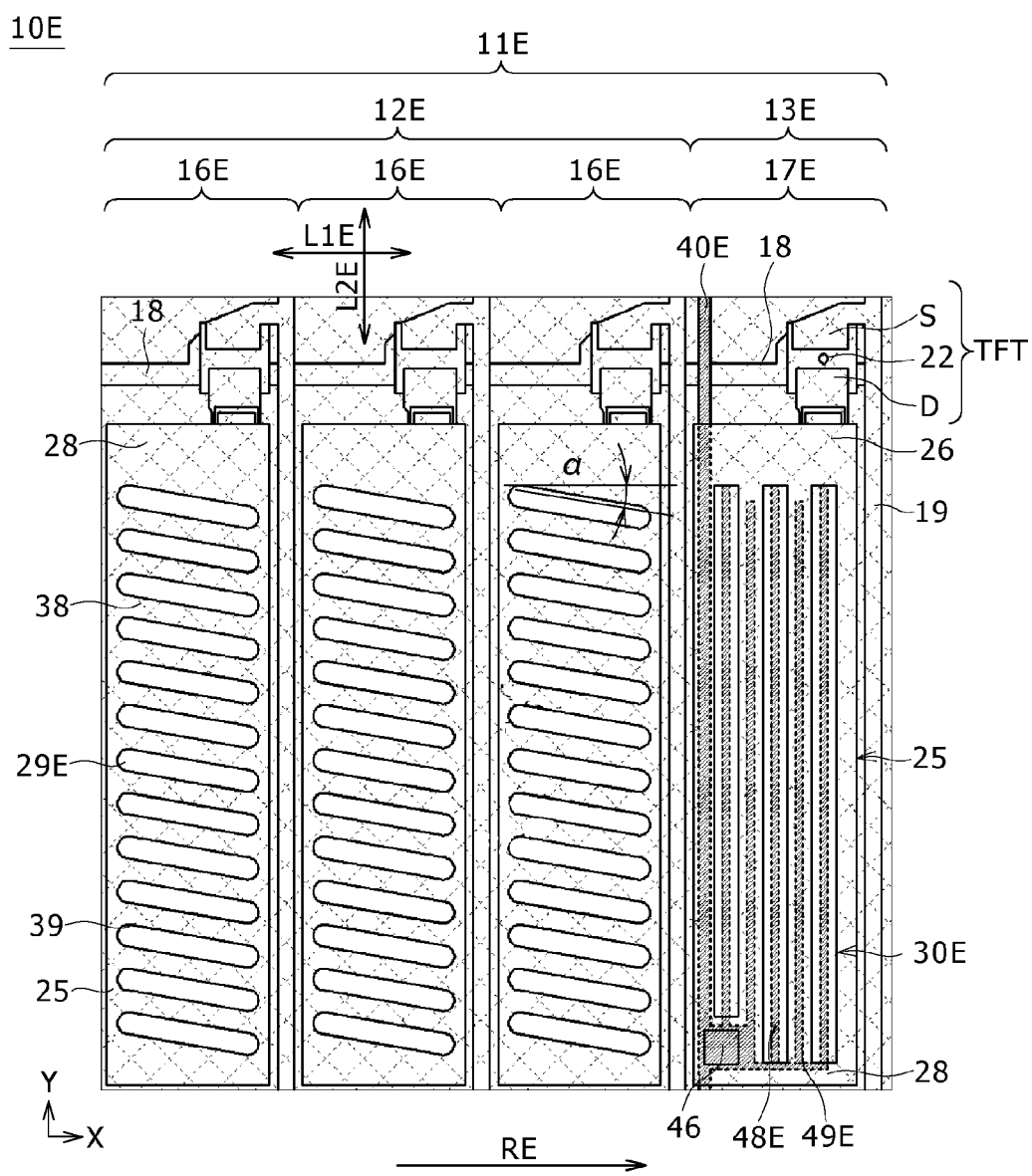
FIG. 9 is a plan view showing the outline of an array substrate of one pixel in a fifth embodiment.

A liquid crystal display panel 10E of a fifth embodiment will be described below with use of FIG. 9. FIG. 9 corresponds to FIG. 6 for the liquid crystal display panel 10B of the second embodiment. For the liquid crystal display panel 10E of the fifth embodiment, the part having the same configuration as that of the part in the liquid crystal display panel 10B of the second embodiment is given the same reference symbol, and the alphabet is changed to "E" for the reference symbol having the alphabet. Detailed description of these parts is omitted.

The main difference in the configuration between the liquid crystal display panel 10E of the fifth embodiment and the liquid crystal display panel 10B of the second embodiment is that the extending direction of a second slit aperture 30E of a viewing angle control part 13E in the fifth embodiment is parallel to the signal line 19 in contrast to the second embodiment, in which the extending direction of the second slit aperture 30B of the viewing angle control part 13B is parallel to the scan line 18.

In the liquid crystal display panel 10E of the fifth embodiment, first slit apertures 29E of a display part 12E are based on the single domain structure and the extending direction thereof is inclined to the scan line by an angle of $+\alpha 1$. Furthermore, the extending direction of the second slit aperture 30E of the viewing angle control part 13E is parallel to the signal line 19. In addition to an auxiliary interconnect 40E, first light blocking members 48E as extension parts from the auxiliary interconnect 40E are provided with a width of equal to or not less than 2 μm at the positions of the center part of the width of the second slit aperture 30E across the entire length of the second slit aperture 30E in plan view, similarly to the liquid crystal display panel 10B of the second embodiment. The auxiliary interconnect 40E and the first light blocking members 48E are formed in the same layer by using the same member in the same step as those of the source electrode S.

Furthermore, second light blocking members 49E as extension parts from the auxiliary interconnect 40E are also provided at the positions between the second slit apertures 30E with a width of equal to or not less than 2 μm and a length slightly shorter than the entire length of the second slit aperture 30E in plan view. The second light blocking members 49E are formed in the same layer by using the same member in the same step as those of the signal line 19. As just described, the present application can be applied also to a liquid crystal display panel in which the slit aperture of the viewing angle control area is parallel to the signal line 19.

Sixth Embodiment

Figure 10:
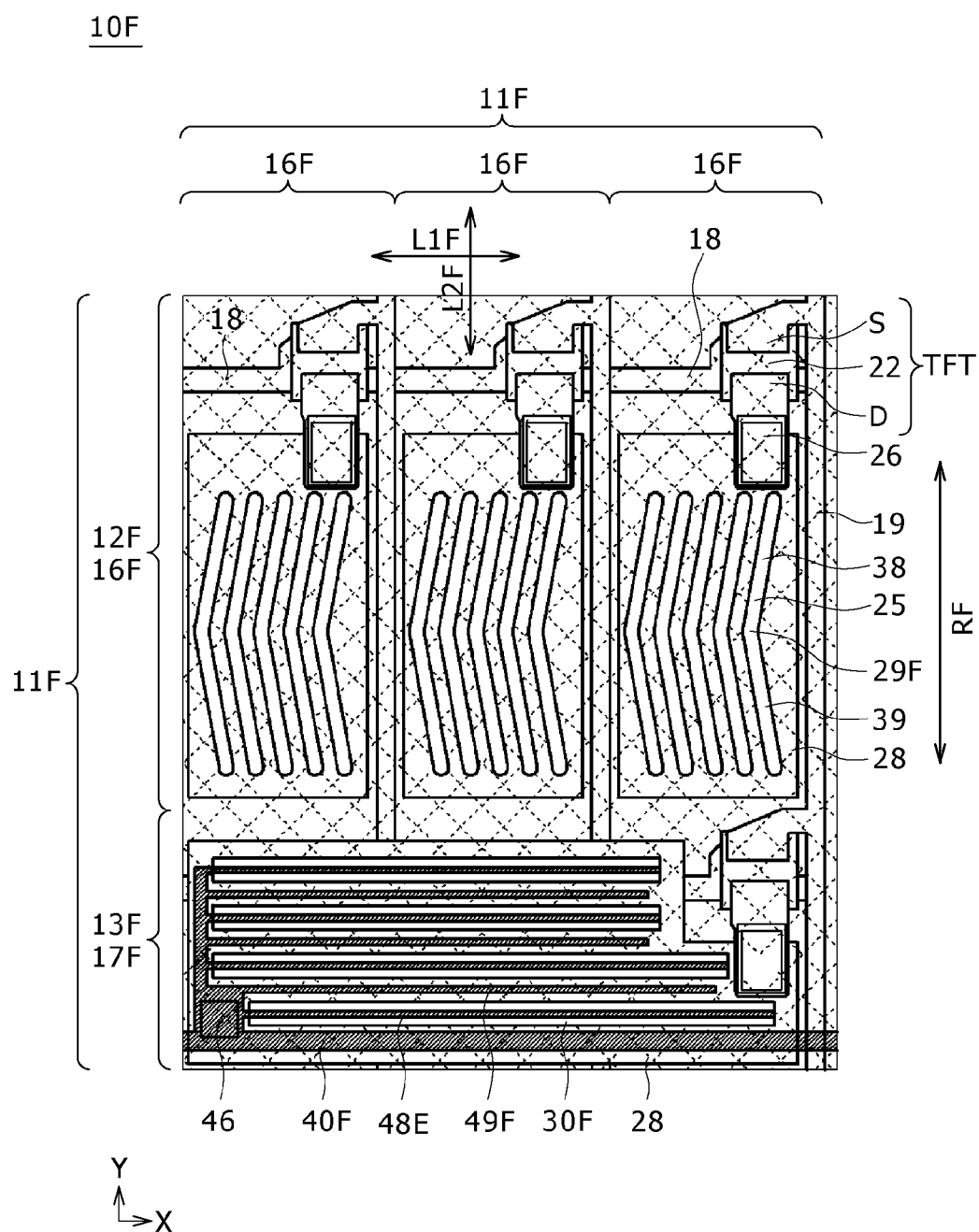
FIG. 10 is a plan view showing the outline of an array substrate of one pixel in a sixth embodiment.

A liquid crystal display panel 10F of a sixth embodiment will be described below with use of FIG. 10. FIG. 10 corresponds to FIG. 7 for the liquid crystal display panel 10C of the third embodiment. For the liquid crystal display panel 10F of the sixth embodiment, the part having the same configuration as that of the part in the liquid crystal display panel 10C of the third embodiment is given the same reference symbol, and the alphabet is changed to "F" for the reference symbol having the alphabet. Detailed description of these parts is omitted. The position of the viewing angle control sub-pixel is the main difference in the configuration between the liquid crystal display panel 10F of the sixth embodiment and the liquid crystal display panel 10C of the third embodiment.

In the liquid crystal display panel 10F of the sixth embodiment, as shown in FIG. 10, a viewing angle control sub-pixel 17F is so formed across three display sub-pixels 16F as to be adjacent to three display sub-pixels 16F along the extending direction of the signal line 19 (vertical direction in FIG. 10). Therefore, the plural viewing angle control sub-pixels 17F are aligned in parallel to the scan line 18, and thus an auxiliary interconnect 40F is formed in the same layer by using the same member in the same step as those of the scan line 18. This allows the auxiliary interconnect 40F to range across the plural viewing angle control sub-pixels 17F.

In this manner, the auxiliary interconnect 40F can be formed without addition of a manufacturing step. Furthermore, first light blocking members 48F and second light blocking members 49F as extension parts from the auxiliary interconnect 40F are formed in the same layer as that of the scan line 18. Thus, the first light blocking members 48F and the second light blocking members 49F are formed in the array substrate AR. Therefore, differently from the case in which the light blocking member is provided in the color filter substrate CF, misalignment of the positions of the first light blocking members 48F and the second light blocking members 49F from the positions of the second slit apertures 30F due to positional misalignment in bonding of the array substrate AR to the color filter substrate CF does not occur.

Seventh Embodiment

Figure 11:
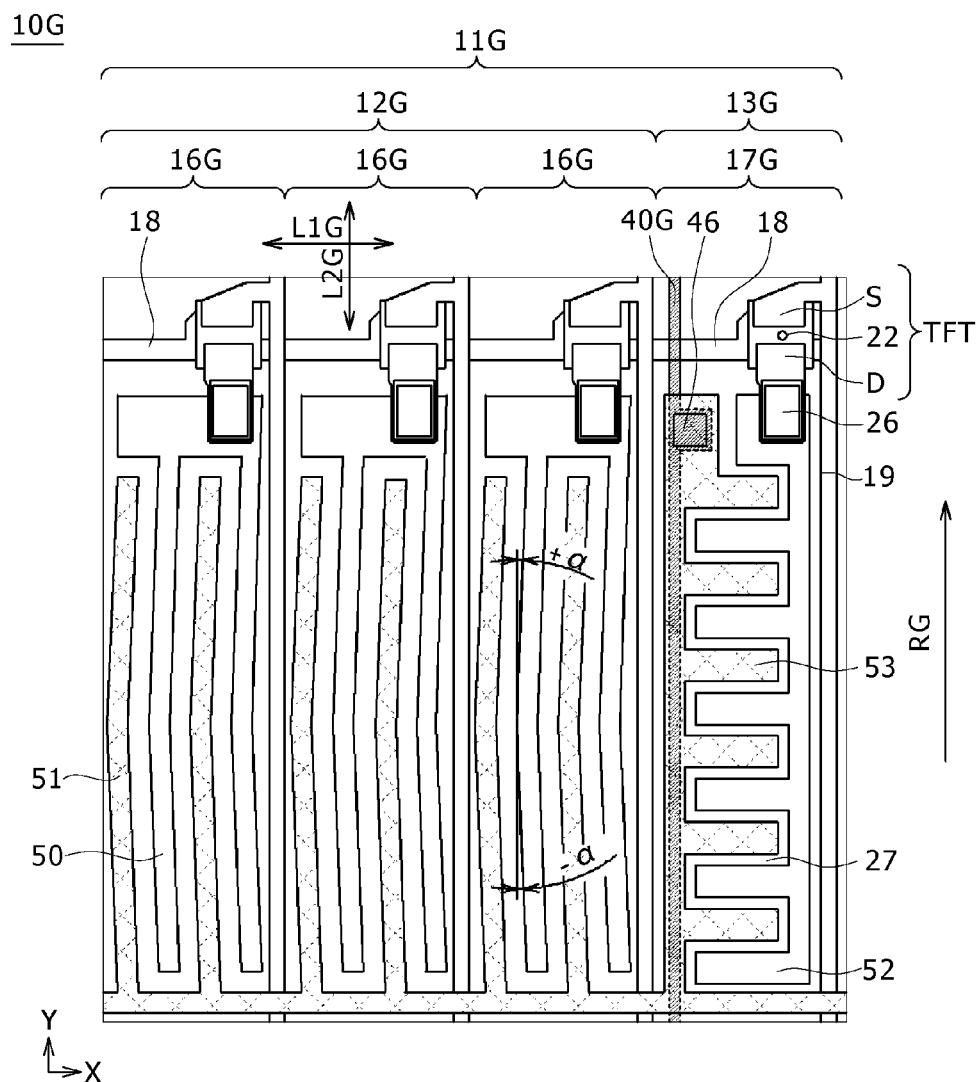
FIG. 11 is a plan view showing the outline of an array substrate of one pixel in a seventh embodiment.

A liquid crystal display panel 10G of a seventh embodiment will be described below with use of FIG. 11. FIG. 11 corresponds to FIG. 1 for the liquid crystal display panel 10A of the first embodiment. For the liquid crystal display panel 10G of the seventh embodiment, the part having the same configuration as that of the part in the liquid crystal display panel 10A of the first embodiment is given the same reference symbol, and the alphabet is changed to "G" for the reference symbol having the alphabet. Detailed description of these parts is omitted. The main difference in the configuration between the liquid crystal display panel 10G of the seventh embodiment and the liquid crystal display panel 10A of the first embodiment is that plural slits are formed in the first electrode in the liquid crystal display panel 10G of the seventh embodiment in contrast to the liquid crystal display panel 10A of the first embodiment, in which the first electrode is formed in a blanket manner.

In the liquid crystal display panel 10G of the seventh embodiment, as shown in FIG. 11, a first electrode 50 operating as the pixel electrode of a display part 12G and a second electrode 51 operating as the common electrode are provided in such a manner that the second electrode 51 is formed over the first electrode 50 with the intermediary of a layer formed of the inter-electrode insulating film 27. Furthermore, the first electrode 50 and the second electrode 51 are formed in such a manner that elongated terminals forming angles of $+\alpha$ and $-\alpha$ with the signal line 19 and extended with a bent shape have a comb-teeth shape and are interdigitated with each other in plan view. Similarly, a first electrode 52 operating as the pixel electrode of a viewing angle control part 13G and a second electrode 53 operating as the common electrode are also provided in such a manner that the second electrode 53 is formed over the first electrode 52 with the intermediary of the layer formed of the inter-electrode insulating film 27. Furthermore, the first electrode 52 and the second electrode 53 are formed in such a manner that terminals extended in parallel to the scan line 18 have a comb-teeth shape and are interdigitated with each other in plan view.

In addition, an auxiliary interconnect 40G is formed in the same layer by using the same member in the same step as those of the signal line 19. As shown in FIG. 11, the auxiliary interconnect 40G is formed in parallel to the signal line 19, and the second electrode 53 and the auxiliary interconnect 40G are electrically connected to each other via the third contact hole 46. In FIG. 11, only the comb-teeth part of the second electrode is shown in the display sub-pixel 16G and the viewing angle control sub-pixel 17G for easy understanding of the relationship between the first electrode and the second electrode. However, actually the second electrode is formed also over e.g. the scan line 18, the signal line 19, and the TFT and formed across the display sub-pixel 16G and the viewing angle control sub-pixel 17G similarly to the other embodiments.

In the above, examples of the liquid crystal display panel have been described as the embodiments of the present application. Such liquid crystal display panels of the embodiments of the present application can be used for various kinds of electronic apparatus such as personal computers, cellular phones, portable information terminals, and car navigation systems. Because the basic configurations of these various kinds of electronic apparatus are well known to those skilled in the art, detailed description thereof is omitted.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display panel having a plurality of pixels and a first substrate and a second substrate that are so disposed as to be opposed to each other and sandwich a liquid crystal layer, each of the pixels including a display sub-pixel and a viewing angle control sub-pixel, the liquid crystal display panel, comprising:
    a first electrode configured to operate as a pixel electrode and be formed in the first substrate and in each of the display sub-pixels and the viewing angle control sub-pixels; and
    a second electrode configured to operate as a common electrode and be formed in the first substrate and over the first electrode with intermediary of an insulating film across the display sub-pixels and the viewing angle control sub-pixels, wherein
    an auxiliary interconnect electrically connected to the second electrode is formed in the viewing angle control sub-pixel.

2. The liquid crystal display panel according to claim 1, wherein
    a signal line and a scan line are formed in the viewing angle control sub-pixel of the first substrate, and
    the auxiliary interconnect is formed in the same layer as a layer of the signal line or the scan line.

3. The liquid crystal display panel according to claim 1, wherein
    the auxiliary interconnect is located on an end part side of the first electrode of the viewing angle control sub-pixel.

4. The liquid crystal display panel according to claim 1, wherein
    a plurality of slits are formed in the second electrode of the viewing angle control sub-pixel, and
    the auxiliary interconnect has an extension part extended from the auxiliary interconnect at a position corresponding to a center of width of the slit.

5. The liquid crystal display panel according to claim 1, wherein
    a plurality of slits are formed in the second electrode of the viewing angle control sub-pixel, and
    the auxiliary interconnect has an extension part extended from the auxiliary interconnect at a position corresponding to a center of a region between the slits adjacent to each other.

6. The liquid crystal display panel according to claim 1, wherein
    the auxiliary interconnect is composed of a metal material.

7. An electronic apparatus, comprising
    the liquid crystal display panel having a plurality of pixels and a first substrate and a second substrate that are so disposed as to be opposed to each other and sandwich a liquid crystal layer, each of the pixels including a display sub-pixel and a viewing angle control sub-pixel, the liquid crystal display panel, including: a first electrode configured to operate as a pixel electrode and be formed in the first substrate and in each of the display sub-pixels and the viewing angle control sub-pixels; and a second electrode configured to operate as a common electrode and be formed in the first substrate and over the first electrode with intermediary of an insulating film across the display sub-pixels and the viewing angle control sub-pixels, wherein
    an auxiliary interconnect electrically connected to the second electrode is formed in the viewing angle control sub-pixel.

* * * * *